United States Patent
Komatsu

(10) Patent No.: US 11,381,316 B2
(45) Date of Patent: Jul. 5, 2022

(54) OPTICAL TRANSMITTER AND OPTICAL TRANSMISSION METHOD

(71) Applicant: NEC Corporation, Tokyo (JP)

(72) Inventor: Hirokazu Komatsu, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/288,954

(22) PCT Filed: Oct. 23, 2019

(86) PCT No.: PCT/JP2019/041519
§ 371 (c)(1),
(2) Date: Apr. 27, 2021

(87) PCT Pub. No.: WO2020/090579
PCT Pub. Date: May 7, 2020

(65) Prior Publication Data
US 2021/0409123 A1    Dec. 30, 2021

(30) Foreign Application Priority Data

Oct. 30, 2018   (JP) .............................. JP2018-204055

(51) Int. Cl.
*H04B 10/548* (2013.01)
*G02F 1/21* (2006.01)

(52) U.S. Cl.
CPC ........... *H04B 10/548* (2013.01); *G02F 1/212* (2021.01)

(58) Field of Classification Search
CPC .............................. H04B 10/548; G02F 1/212
(Continued)

(56) References Cited

U.S. PATENT DOCUMENTS 5,359,449 A * 10/1994 Nishimoto ........... H04B 10/564
398/198
7,200,343 B2 * 4/2007 Ikeuchi ................. G02F 1/0123
359/239

(Continued)

FOREIGN PATENT DOCUMENTS

JP       H11-183858 A     7/1999
JP       2005-037547 A    2/2005
(Continued)

OTHER PUBLICATIONS

Zeng et al; Variation of Signal Reflection on Electrodes of Silicon Mach-Zehnder Modulators: Influence of Nanoscale Variation and Mitigation Strategies; Feb. 2021; Nanomaterials; pp. 1-15. (Year: 2021).*

(Continued)

*Primary Examiner* — Amritbir K Sandhu

(57) ABSTRACT

To provide an optical transmitter and an optical transmission method that can maintain the quality of an optical output signal in a wide wavelength range, an optical transmitter comprises: an optical modulator that includes an electrode and outputs an optical output signal obtained by modulating input light according to a drive signal applied to the electrode; a driver circuit that generates a drive signal and is connected to the optical modulator to apply a drive signal to one end of the electrode; a first element that is connected to the other end of the electrode and terminates the drive signal; and a controller that sets a first resistance value of the first element and a drive amplitude of the drive signal.

20 Claims, 9 Drawing Sheets

(58) Field of Classification Search
USPC .......................................................... 398/183
See application file for complete search history.

(56) References Cited

U.S. PATENT DOCUMENTS

| | | | |
|---|---|---|---|
| 9,553,673 B1* | 1/2017 | Nagarajan | H04B 10/5161 |
| 9,917,583 B2* | 3/2018 | Kuroiwa | H03K 19/018557 |
| 10,551,641 B1* | 2/2020 | Pobanz | G02F 1/0123 |
| 2005/0013522 A1 | 1/2005 | Doi | |
| 2005/0254743 A1* | 11/2005 | Akiyama | H04B 10/58 |
| | | | 385/3 |
| 2007/0003180 A1 | 1/2007 | Tanaka et al. | |
| 2008/0240644 A1 | 10/2008 | Shimizu et al. | |
| 2010/0127736 A1 | 5/2010 | Dixit et al. | |
| 2010/0289521 A1* | 11/2010 | Nakata | H04L 25/0278 |
| | | | 326/30 |
| 2011/0013863 A1 | 1/2011 | Shimizu et al. | |
| 2015/0370095 A1* | 12/2015 | Kondou | G02F 1/035 |
| | | | 385/2 |
| 2017/0134026 A1* | 5/2017 | Kuroiwa | H03K 19/018557 |
| 2019/0028205 A1* | 1/2019 | Huang | H04B 10/516 |
| 2021/0341812 A1* | 11/2021 | Kanazawa | G02F 1/0121 |

FOREIGN PATENT DOCUMENTS

| | | |
|---|---|---|
| JP | 2007-010942 A | 1/2007 |
| JP | 2012-510208 A | 4/2012 |
| JP | 2014-224902 A | 12/2014 |
| WO | 2005/096077 A1 | 10/2005 |
| WO | 2009/119282 A | 10/2009 |

OTHER PUBLICATIONS

Zeng et al; Variation of Signal Reflection on Electrodes of Silicon Mach-Zehnder Modulators: Influence of Nanoscale Variation and Mitigation Strategies; Feb. 2021; MDPI Nanomaterials; pp. 1-15. (Year: 2021).*

International Search Report for PCT Application No. PCT/JP2019/041519, dated Dec. 3, 2019.

English translation of Written opinion for PCT Application No. PCT/JP2019/041519, dated Dec. 3, 2019.

* cited by examiner

OPTICAL TRANSMITTER AND OPTICAL TRANSMISSION METHOD

This application is a National Stage Entry of PCT/JP2019/041519 filed on Oct. 23, 2019, which claims priority from Japanese Patent Application 2018-204055 filed on Oct. 30, 2018, the contents of all of which are incorporated herein by reference, in their entirety.

TECHNICAL FIELD

The present invention relates to an optical transmitter and an optical transmission method, and more specifically relates to an optical transmitter and an optical transmission method being used for modulating light by using an optical waveguide modulator.

BACKGROUND ART

In order to avoid an influence caused by a chirp (oscillation wavelength variation) of a light source, for an electro-optical conversion unit of a broadband optical transmitter, a Mach-Zehnder optical modulator is widely used. An electrode length of the Mach-Zehnder optical modulator is generally several ten millimeters or more, and therefore when the Mach-Zehnder optical modulator is driven by using a high-speed drive signal, a traveling wave-type electrode is used in order to reduce an electrostatic capacitance of an electrode applied with the drive signal. For impedance matching for an electrode, in the electrode, a terminating resister is provided.

The Mach-Zehnder optical modulator requires a drive voltage of several volts. A typical drive voltage is 5 V or more in an optical modulator using lithium niobate ($LiNbO_3$) and is 3V or more in an optical modulator using indium phosphide (InP). In order to apply such a voltage to an electrode, a driver circuit that drives the Mach-Zehnder optical modulator requires a large-size transistor capable of amplifying large current. Therefore, similarly to an electrode of an optical modulator, in order to reduce an influence due to a parasitic capacitance of the transistor, a traveling wave-type driver circuit is used.

With regard to the present invention, PTL 1 describes a wireless device including an off-chip driver.

CITATION LIST

Patent Literature

[PTL 1] Japanese Translation of PCT International Application Publication No. 2012-510208

SUMMARY OF INVENTION

Technical Problem

In wavelength multiplex transmission widely used in a large-capacity communication system, optical modulator characteristics having less wavelength dependency are desired. A semiconductor optical modulator has a feature that size reduction is possible and modulation efficiency is high. However, a drive voltage of the semiconductor optical modulator and a bias voltage causing an optical waveguide loss to be optimum are different, depending on a wavelength of light to be modulated. Since a bias voltage applied to a substrate has wavelength dependency, a capacitance of an electrode portion of an optical modulator also has wavelength dependency. As a result, an impedance of an electrode of the optical modulator has wavelength dependency. Wavelength dependency of an impedance of an electrode causes impedance matching between the electrode and a terminating resistance to be difficult when light having a value different from a design value is modulated.

When impedance matching is insufficient, a waveform of a drive signal applied to an electrode of an optical modulator degrades, and therefore a waveform of a modulated optical signal also degrades. Therefore, when a wavelength range where an optical modulator may be used is broad, due to the above-described wavelength dependency of an impedance, transmission quality of an optical signal may decrease. In this manner, in a general optical modulator, an impedance of an electrode has wavelength dependency, and therefore there is a problem that it is difficult to maintain quality of an optical output signal in a broad wavelength range.

Object of Invention

An object of the present invention is to provide an optical transmitter and an optical transmission method that are capable of maintaining quality of an optical output signal in a broad wavelength range.

Solution to Problem

An optical transmitter according to the present invention includes: an optical modulation means that includes an electrode and outputs an optical output signal acquired by modulating input light according to a drive signal applied to the electrode; a driver circuit that generates the drive signal and is connected to the optical modulation means in such a way as to apply the drive signal to one end of the electrode; a first element that is connected to the other end of the electrode and terminates the drive signal; and a controller that sets a first resistance value of the first element and a drive amplitude of the drive signal.

An optical transmission method according to the present invention includes a procedure of: applying a drive signal generated in a driver circuit to one end of an electrode; outputting an optical output signal acquired by modulating input light according to a drive signal applied to the electrode; and setting a first resistance value of a first element that is connected to the other end of the electrode and terminates the drive signal, and a drive amplitude of the drive signal.

Advantageous Effects of Invention

The optical transmitter and the optical transmission method according to the present invention are able to maintain quality of an optical output signal in a broad wavelength range.

EXAMPLE EMBODIMENT

First Example Embodiment

Figure 1:
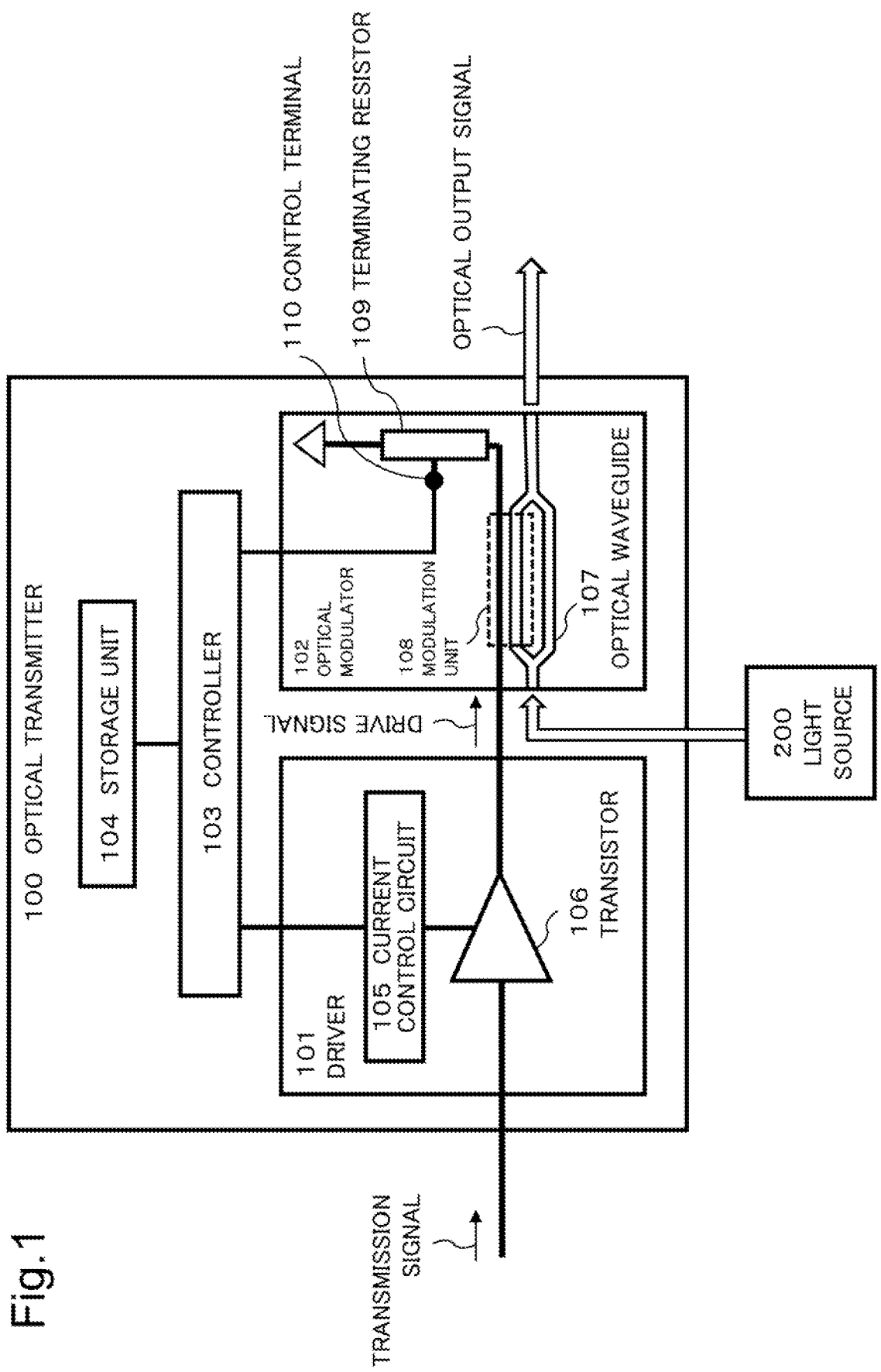
FIG. 1 is a diagram illustrating a configuration example of an optical transmitter 100.

FIG. 1 is a diagram illustrating a configuration example of an optical transmitter 100 according to a first example embodiment of the present invention. The optical transmitter 100 converts a transmission signal being an electric signal including transmitted information to an optical signal and outputs the optical signal as an optical output signal. The optical transmitter 100 includes a driver 101, an optical modulator 102, a controller 103, and a storage unit 104. The driver 101 includes a current control circuit 105 and a transistor 106 and generates an electric signal (drive signal) that drives the optical modulator 102. The current control circuit 105 is connected to the transistor 106 and sets an operation condition such as output current and the like for the transistor 106. The controller 103 can issue an instruction to the current control circuit 105 for output current to be set in the transistor 106. The transistor 106 generates a drive signal having an amplitude based on a transmission signal input to the driver 101 and a set value from the current control circuit 105. The transistor 106 outputs current having an amplitude in which a voltage amplitude (drive amplitude) required for suitably operating an optical waveguide 107 is acquired in a modulation unit 108. An arrow assigned to a signal in drawings indicates an example and does not limit a direction of a signal.

The optical modulator 102 includes an optical waveguide 107 and a terminating resistor 109. The optical waveguide 107 is a Mach-Zehnder-type semiconductor optical waveguide including a modulation unit 108. In the optical modulator 102, a drive signal is applied to an electrode of the modulation unit 108 in which the terminating resistor 109 is a load resistance. One end of the terminating resistor 109 is connected to the electrode and the other end of the terminating resistor 109 is grounded.

The optical modulator 102 modulates, by using a drive signal, continuous light input to the optical waveguidev 107 from a light source 200 outside the optical transmitter 100 and outputs the modulated optical signal (optical output signal) to an outside of the optical transmitter 100. The light source 200 outputs light having a wavelength defined by a communication system in which the optical transmitter 100 is used. The light source 200 is, for example, a semiconductor laser and may be included in the optical transmitter 100.

The modulation unit 108 includes one arm of the optical waveguide 107 and an electrode, one end of which is connected to the driver 101. The electrode and the arm are disposed in such a way that a drive signal input from the driver 101 travels in close parallel with light propagating in the arm. The electrode of the modulation unit 108 is a travelling wave-type electrode configured in such a way that a propagation velocity of a drive signal and a propagation velocity of input light are matched.

The terminating resistor 109 is a variable resistor. A resistance value of the terminating resistor 109 is adjusted by an electric signal applied from the controller 103 to a control terminal 110. The current control circuit 105 and the control terminal 110 are connected to the controller 103. The controller 103 is connected to the storage unit 104. The storage unit 104 is, for example, but not limited to, a semiconductor memory. The storage unit 104 may be provided inside the controller 103. The controller 103 is a control circuit and controls, based on a set value stored in the storage unit 104, the current control circuit 105 and the terminating resistor 109.

Description of Operation

Figure 2:
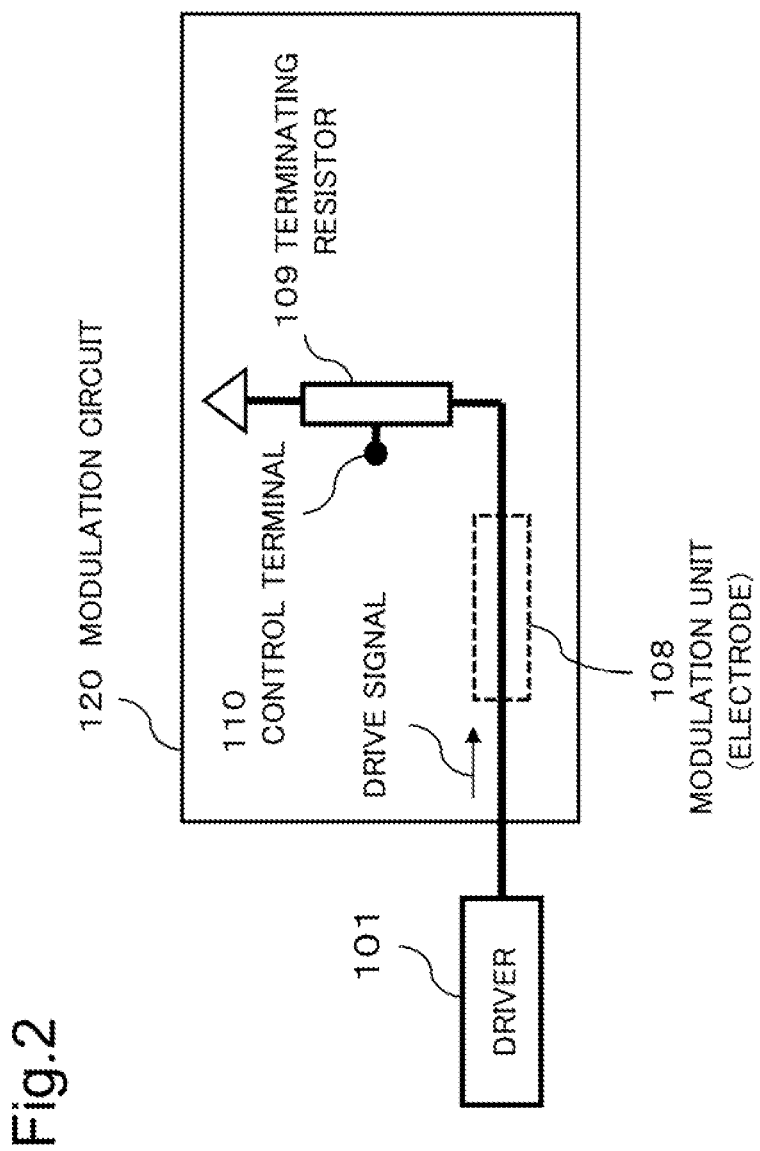
FIG. 2 is a conceptual diagram of a modulation circuit 120.

An operation of the optical transmitter 100 is described. In the following drawings and description, an already-described element is assigned with the same reference sign and overlapping description is omitted. FIG. 2 is a conceptual diagram of a modulation circuit 120 including an electric component of the optical modulator 102 related to a modulation waveform of an optical output signal. The modulation circuit 120 is an electric circuit including an electrode of a modulation unit 108 and a terminating resistor 109. One end of the electrode of the modulation unit 108 is connected to the driver 101, and a drive signal is supplied from the driver 101 to the modulation circuit 120. The other end of the electrode of the modulation unit 108 is connected to the terminating resistor 109. The driver 101 is a signal source that outputs a drive signal. In other words, the electrode is a line that connects the driver 101 and the terminating resistor 109. The terminating resistor 109 terminates a drive signal propagating in the electrode. In the following, an operation of the optical transmitter 100 is described in which a lossless line ranges from the driver 101 to a connecting point between the electrode and the terminating resistor 109, and the terminating resistor 109 is a pure resistance.

Figure 3:
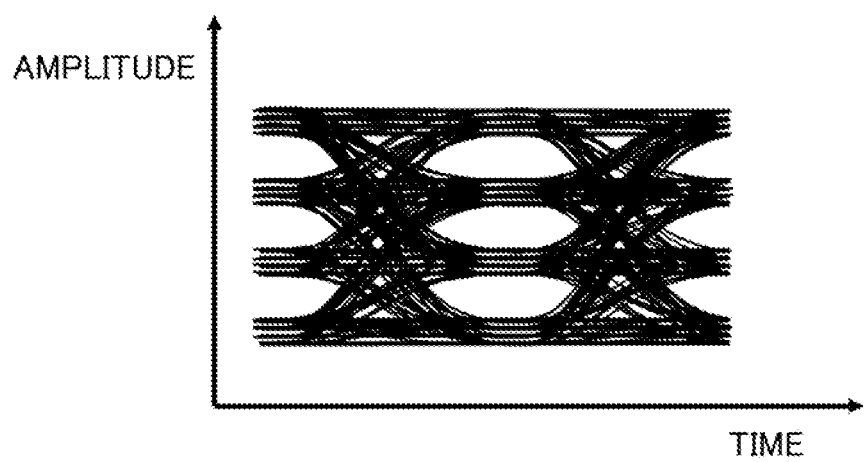
FIG. 3 is a diagram illustrating an example of an eye diagram of an optical output signal subjected to quadruple amplitude modulation.
Figure 4:
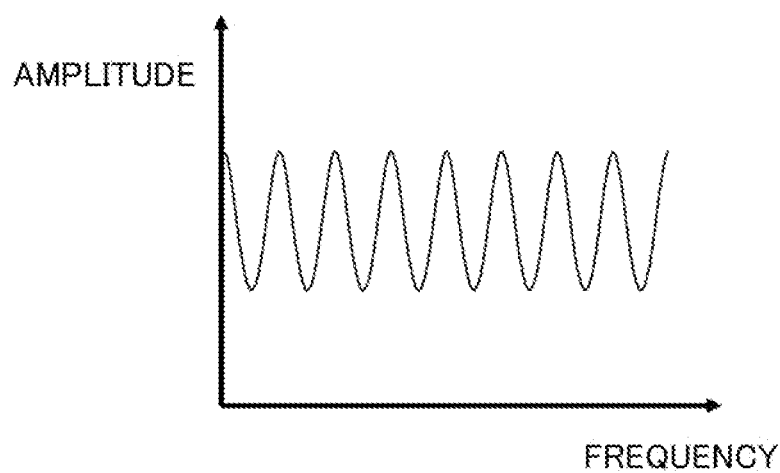
FIG. 4 is a diagram illustrating an example of frequency characteristics of an optical output signal in which a matching state illustrated in FIG. 3 is established.
Figure 5:
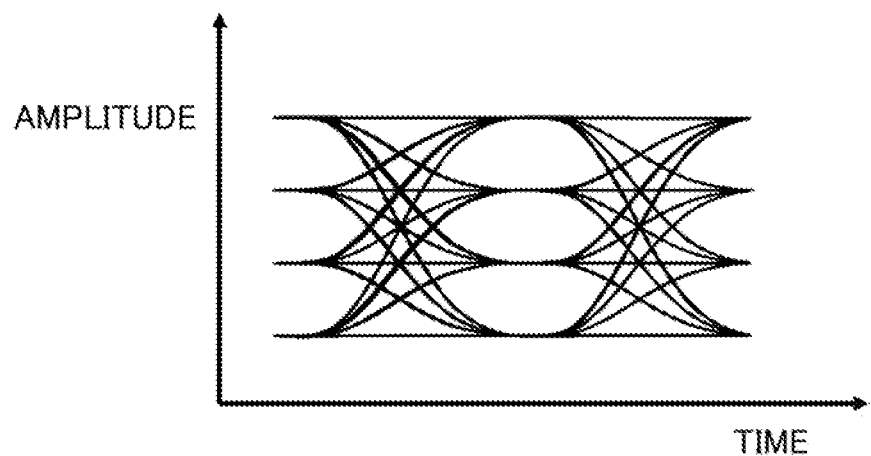
FIG. 5 is a diagram illustrating an example of an eye diagram of an optical output signal subjected to quadruple amplitude modulation after execution of impedance matching.
Figure 6:
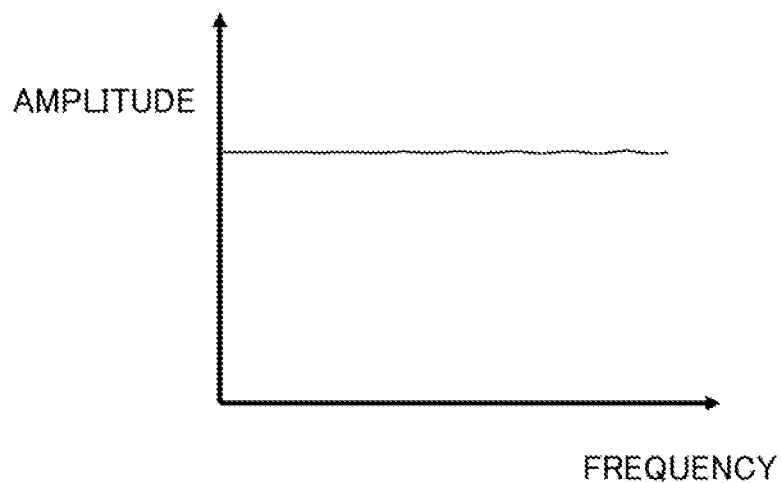
FIG. 6 is a diagram illustrating an example of frequency characteristics of an optical output signal in which a matching state illustrated in FIG. 5 is established.

FIG. 3 and FIG. 5 each illustrate an example of a waveform (optical output waveform) of an optical output signal subjected to quadruple amplitude modulation. FIG. 3 and FIG. 5 are different in a matching state between an impedance of the electrode of the modulation unit 108 and an impedance (resistance value) of the terminating resistor 109. FIG. 4 illustrates an example of frequency characteristics of an amplitude of an optical output signal in which a matching state illustrated in FIG. 3 is established. Frequency characteristics of an optical output signal are reflected with frequency characteristics of the modulation circuit 120 (i.e. an electric circuit of the optical modulator 102). FIG. 6 illustrates an example of frequency characteristics of an optical output signal in which a matching state illustrated in FIG. 5 is established. Any of FIG. 3 to FIG. 6 indicates an example of a waveform, and any scale is employable for each of a vertical axis and a horizontal axis.

FIG. 3 illustrates an example of an optical output waveform (an example of an eye diagram) in which mismatching between an impedance of the electrode of the modulation unit 108 and a resistance value of the terminating resistor 109 is large. Due to variations in production of an optical waveguide 107 including an electrode and a difference between a wavelength of an optical output signal and a set value, a bias voltage applied to a semiconductor optical modulator may have various values. As a result, an impedance of the electrode may not always be matched with a resistance of the terminating resistor 109. FIG. 3 indicates that due to the impedance mismatching, a baseline of each modulation value of an optical output waveform is thick.

Herein, when an impedance of the electrode is Z and a resistance value of the terminating resistor 109 is R, a reflection coefficient ρ is represented by $$\rho = (Z-R)/(Z+R) \quad (1)$$

When a gap (mismatching) between an impedance Z of the electrode and an impedance R of the terminating resistor 109 is assumed to be 20%, a refection coefficient between the electrode and the terminating resistor 109 is, according to equation (1), 0.2/1.8=11%. A signal reflected by the terminating resistor 109 is reflected again at a connecting point between the driver 101 and the modulation circuit 120 and travels in the electrode of the modulation unit 108 toward the terminating resistor 109. As a result, an optical output waveform is disturbed, and a waveform of an eye diagram becomes thick as illustrated in FIG. 3. In contrast, in a frequency response illustrated in FIG. 4, a ripple having periodicity due to multiple reflection is generated. In quadruple amplitude modulation cited as an example herein, an inter-symbol level difference decreases to ⅓, compared with binary amplitude modulation using only a high level/a low level, and therefore an influence of reflection increases relatively three times. As a result, degradation of EVM (error vector magnitude, modulation signal error) characteristics in phase modulation and a decrease in noise tolerance and reception sensitivity tend to occur.

The terminating resistor 109 can adjust a resistance value by an electric signal applied to the control terminal 110. Based on adjustment of a resistance value, the electrode and the terminating resistor 109 can be made close to a matching state. FIG. 5 illustrates an example of an optical output waveform after execution of impedance matching between the electrode and the terminating resistor 109 based on adjustment of a resistance value of the terminating resistor 109. FIG. 6 illustrates an example of frequency characteristics of an optical output signal in the case. FIG. 5 exemplarily illustrates that based on impedance matching, a variation of a signal waveform in an eye diagram is reduced. FIG. 6 exemplarily illustrates that also in a frequency response, a periodic ripple is resolved. In this manner, a resistance value of the terminating resistor 109 is adjusted, and thereby an inter-symbol level difference is expanded and transmission quality of an optical output signal is improved.

Figure 7:
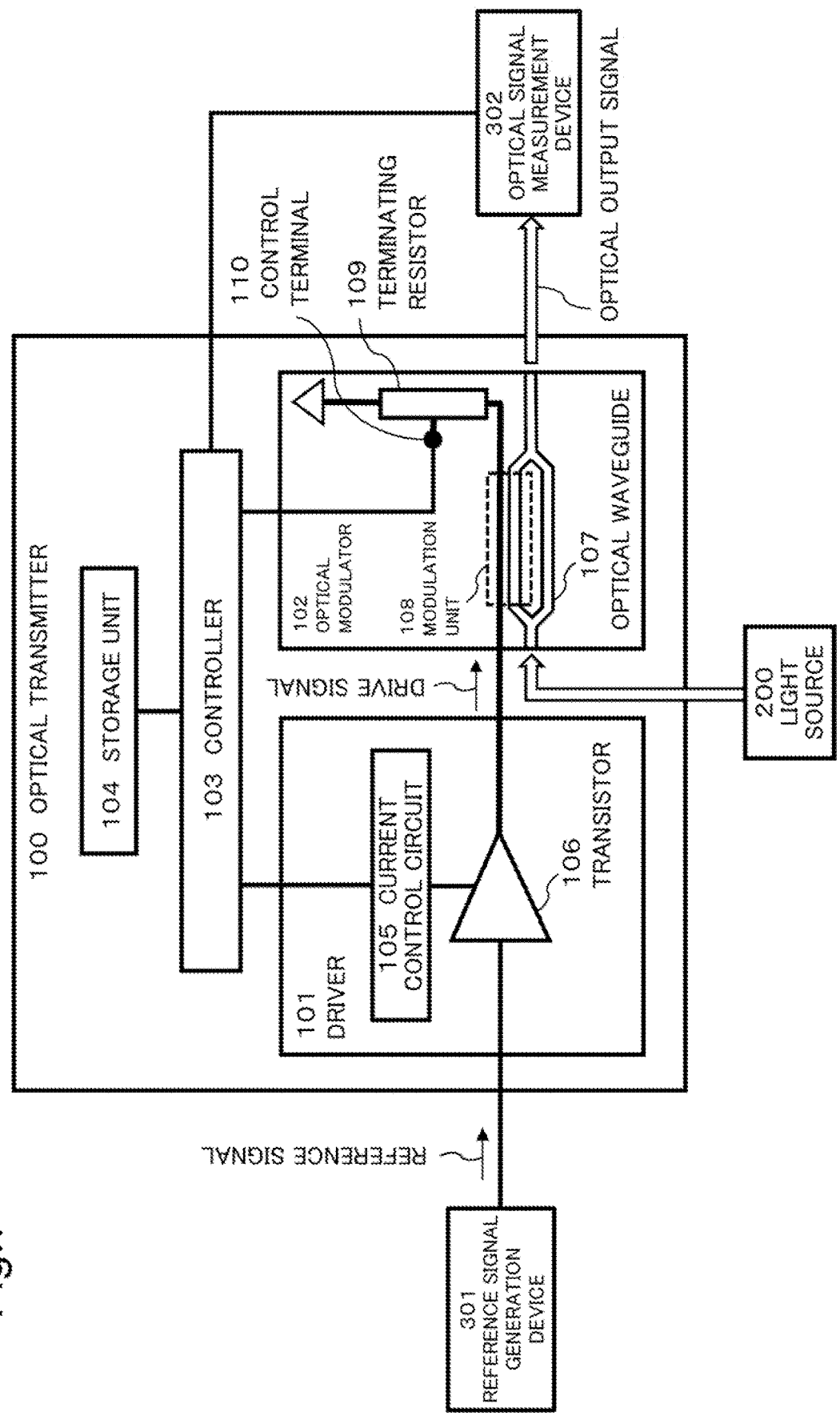
FIG. 7 is a diagram illustrating a configuration example of an optical transmission system 300.

FIG. 7 is a diagram illustrating a configuration example of an optical transmission system 300 including a function for executing impedance matching between the electrode of the modulation unit 108 and the terminating resistor 109. An input of the driver 101 of the optical transmitter 100 illustrated in FIG. 1 is connected to a reference signal generation device 301. An optical output of the optical modulator 102 is connected to an optical signal measurement device 302. The reference signal generation device 301 inputs a generated reference signal to the driver 101. The reference signal is an electric signal converted, instead of a transmission signal, to an optical output signal by the optical transmitter 100. The optical signal measurement device 302 measures characteristics of an optical output signal modulated based on a reference signal. A control terminal 110 of the terminating resistor 109 is connected to the controller 103. The optical transmission system 300 controls, based on a measurement result of an optical output signal acquired by the optical signal measurement device 302, the current control circuit 105 and the terminating resistor 109 via the controller 103. A measurement result of the optical signal measurement device 302 is recorded in the storage unit 104.

Figure 8:
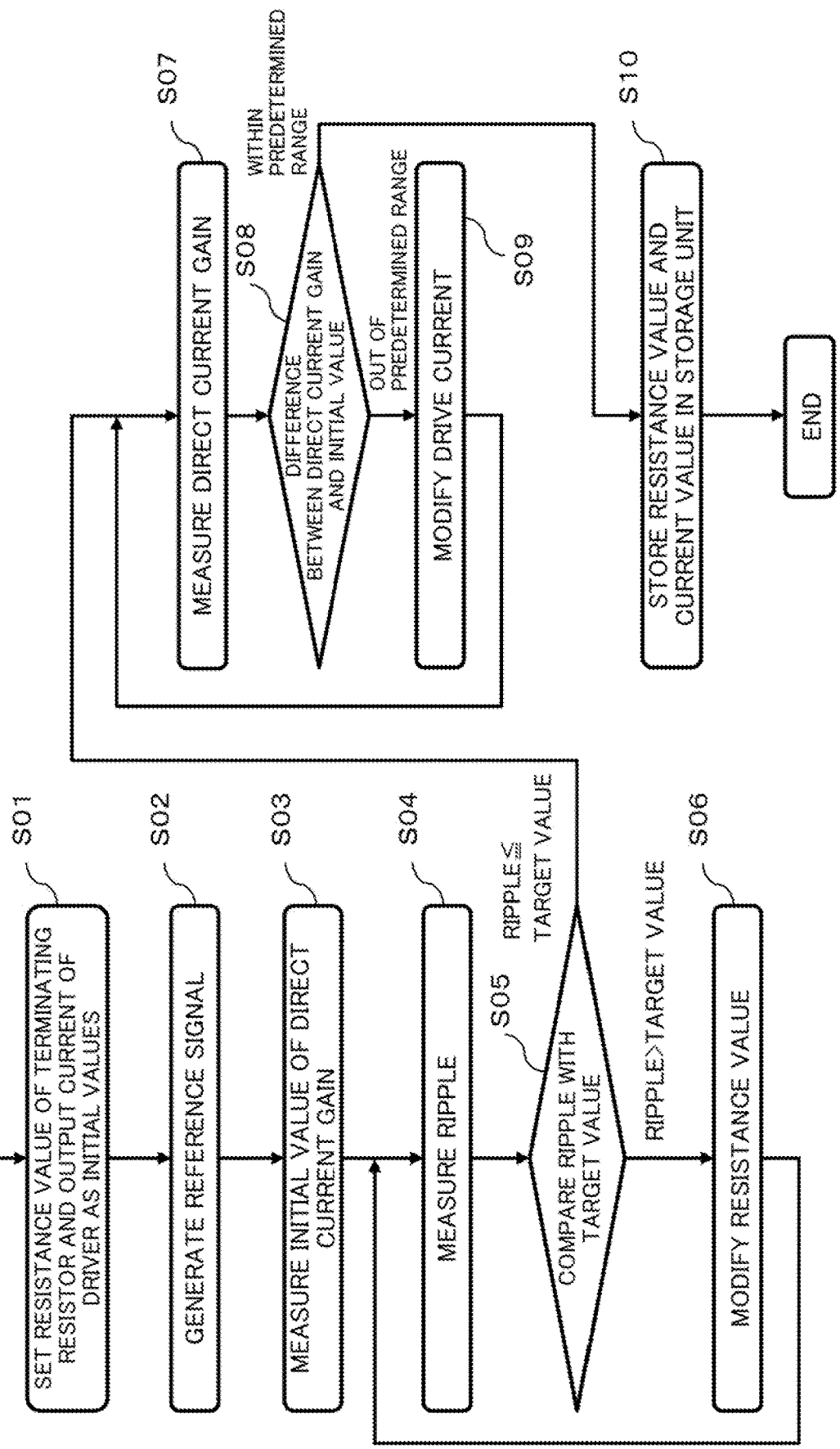
FIG. 8 is a flowchart illustrating an example of an adjustment procedure for a resistance value of a terminating resistor 109 and a drive signal output by a driver 101.

FIG. 8 is a flowchart illustrating an example of an adjustment procedure for a resistance value of the terminating resistor 109 and a drive signal output by the driver 101. In a flow illustrated in FIG. 8, a ripple and a direct current gain of frequency characteristics of an optical output signal relative to a reference signal are measured. The direct current gain is an input/output characteristic of the optical transmitter 100 in which a reference signal is direct current or has a frequency similar to direct current.

First, a resistance value of the terminating resistor 109 and output current of the driver 101 each are set as an initial value (e.g. a set value being an assumed value based on design) (step S01 in FIG. 8). When the reference signal generation device 301 generates a reference signal (step S02), an optical output signal based on the reference signal is output from the optical modulator 102. The optical signal measurement device 302 measures, from a signal (reception signal) acquired by photoelectrically converting the optical output signal, an initial direct current gain being an initial value of a direct current gain (step S03).

In steps S04 to S06, a resistance value of the terminating resistor 109 is adjusted in order to measure a ripple and reduce a ripple. First, the reference signal generation device 301 sweeps a frequency of a reference signal and the optical signal measurement device 302 measures a frequency characteristic (ripple) of an amplitude variation of a reception signal (step S04). The measured ripple is compared with a target value (threshold) defined previously (step S05). When a ripple has a value equal to or less than the target value, it is determined that the ripple is sufficiently small. In this case, processing moves to step S07. When a ripple exceeds the target value, it is determined that the ripple is large. In this case, processing moves to step S06 (step S05). When a ripple exceeds the target value, the optical signal measurement device 302 modifies a resistance value of the terminating resistor 109 via the controller 103 (step S06). With the modified resistance value of the terminating resistor 109, a ripple is measured again (step S04).

Measurement and adjustment of a resistance value in steps S04 to S06 are repeated until a ripple has a value equal to or less than the target value in step S05. Alternatively, when the number of executions of any of steps S04 to S06 reaches a predetermined number of times, the optical signal measurement device 302 may output, to an outside, an alarm indicating that reduction of a ripple results in a failure. The optical signal measurement device 302 or the controller 103 may instruct the reference signal generation device 301 to sweep a frequency of a reference signal.

In step S05, even when a ripple has a value equal to or less than the target value, it may be possible that a resistance value is further modified, execution of a procedure of steps S04 to S06 is continued, and processing moves to step S07 when a ripple is further reduced. By this procedure, a ripple is further reduced.

In steps S07 to S09, in order to correct a direct current gain having varied due to modification of a resistance value of the terminating resistor 109, current (drive current) of a drive signal output by the driver 101 is adjusted.

In a resistance value of the terminating resistor 109 determined in step S06 executed immediately before, a direct current gain is measured again (step S07). A difference between the direct current gain measured in step S07 and the initial value of the direct current gain measured in step S03 is evaluated (step S08). When the difference exceeds a predetermined range, processing moves to step S09. The optical signal measurement device 302 modifies, via the controller 103, drive current output by the driver 101 (step S09). The optical signal measurement device 302 issues an instruction to the controller 103 in such a way as to modify, based on the current control circuit 105, drive current output by the transistor 106. A direct current gain in the modified drive current is measured (step S07).

In step S08, when a difference between a direct current gain measured in step S07 and an initial value of a direct current gain measured in step S03 falls within a predetermined range, processing moves to step S10. The optical signal measurement device 302 reports, to the controller 103, as set values, a resistance value of the terminating resistor 109 set in step S06 and drive current set in step S09 and output by the driver 101. The controller 103 records the reported set values in the storage unit 104 (step S10).

Measurement of a direct current gain and modification of drive current in steps S07 to S09 are repeated in step S08 until a difference between a direct current gain measured in step S07 and an initial value of the direct current gain falls within a predetermined range. Alternatively, when the number of executions of any of steps S07 to S09 reaches a predetermined number of times, the optical signal measurement device 302 may output, to an outside, an alarm indicating that adjustment of drive current results in a failure.

Even when a difference between a direct current gain and an initial value of the direct current gain falls within a predetermined range, it may be possible that drive current is further modified, execution of a procedure of steps S07 to S09 is continued, and processing moves to step S10 when a direct current gain is closer to the initial value. Based on the procedure, a direct current gain can be made closer to the initial value. In step S08, a direct current gain measured in step S07 may be compared with a direct current gain different from the initial value. Based on comparison with a direct current gain different from the initial value, a direct current gain different from the initial value can be determined as a set value.

In step S04 of FIG. 8, the reference signal generation device 301 may sweep a frequency of a single signal when frequency characteristics of a ripple are measured, and a multitone signal including a broadband frequency component may be used as a reference signal. In either of the cases, the optical signal measurement device 302 measures an amplitude of a frequency component of a reference signal from a signal acquired by photoelectrically converting an optical output signal by using a photodiode or the like and thereby frequency characteristics of an optical output signal are acquired. Alternatively, the reference signal generation device 301 may generate, at various speeds, a transmission signal actually used in the optical transmitter 100. When the optical modulator 102 executes phase modulation, a coherent receiver is used for the optical signal measurement device 302. The coherent receiver may measure, instead of a ripple, an EVM or a Q-value of a constellation and measure optical output power instead of a direct current gain.

As described above, in the optical transmitter 100, as a terminating resistor 109 connected to an electrode of the modulation unit 108, a variable resistor is used. A resistance value of the terminating resistor 109 is adjusted, by using the controller 103, to a value in which quality degradation of an optical output signal due to impedance mismatching between the electrode of the modulation unit 108 and the terminating resistor 109 is reduced. In this case, a resistance value of the terminating resistor 109 and drive current of the driver 101 are adjusted to a preferable value in a wavelength of an optical output signal by measuring characteristics such as a ripple and a direct current gain of the optical modulator 102. An adjustment result is stored as a set value in the storage unit 104. As a result, the optical transmitter 100 enables impedance matching between an electrode and a terminating resistance according to a wavelength of an optical output signal even when characteristics of the optical modulator 102 have wavelength dependency. In other words, the optical transmitter 100 can maintain quality of an optical output signal in a broad wavelength range.

In an optical transmitter having a broad bandwidth, an optical output signal may be equalized by using a digital filter provided in a digital signal processor. However, in order to accurately equalize disturbance of a signal waveform due to reflection having non-linear phase characteristics, a large-scale circuit is required, resulting in an increase in cost and power consumption. However, the optical transmitter 100 adjusts a resistance value of a terminating resistor and thereby can increase transmission quality of an optical output signal with less power consumption. As a result, it is easy to increase, for example, a bit rate based on multi-value conversion of a symbol.

Minimum Configuration of First Example Embodiment

The advantageous effect of the optical transmitter 100 described according to the first example embodiment is achieved also in the following configuration. In other words, an optical transmitter 100 includes an optical modulator 102, a driver 101, a terminating resistor 109, and a controller 103. The optical modulator 102 includes an electrode and outputs an optical output signal acquired by modulating input light according to a drive signal applied to the electrode. The driver 101 is a drive circuit connected to the optical modulator 102, generates a drive signal, and applies the drive signal to one end of the electrode. The terminating resistor 109 is connected to the other end of the electrode and terminates a drive signal. The controller 103 sets a resistance value of the terminating resistor 109.

The optical transmitter 100 including such a configuration also sets, based on characteristics of an optical output signal output by the optical modulator 102, a resistance value of the terminating resistor 109, thereby enables impedance matching between an electrode and a terminating resistance, and as a result, can maintain quality of an optical output signal.

Second Example Embodiment

Figure 9:
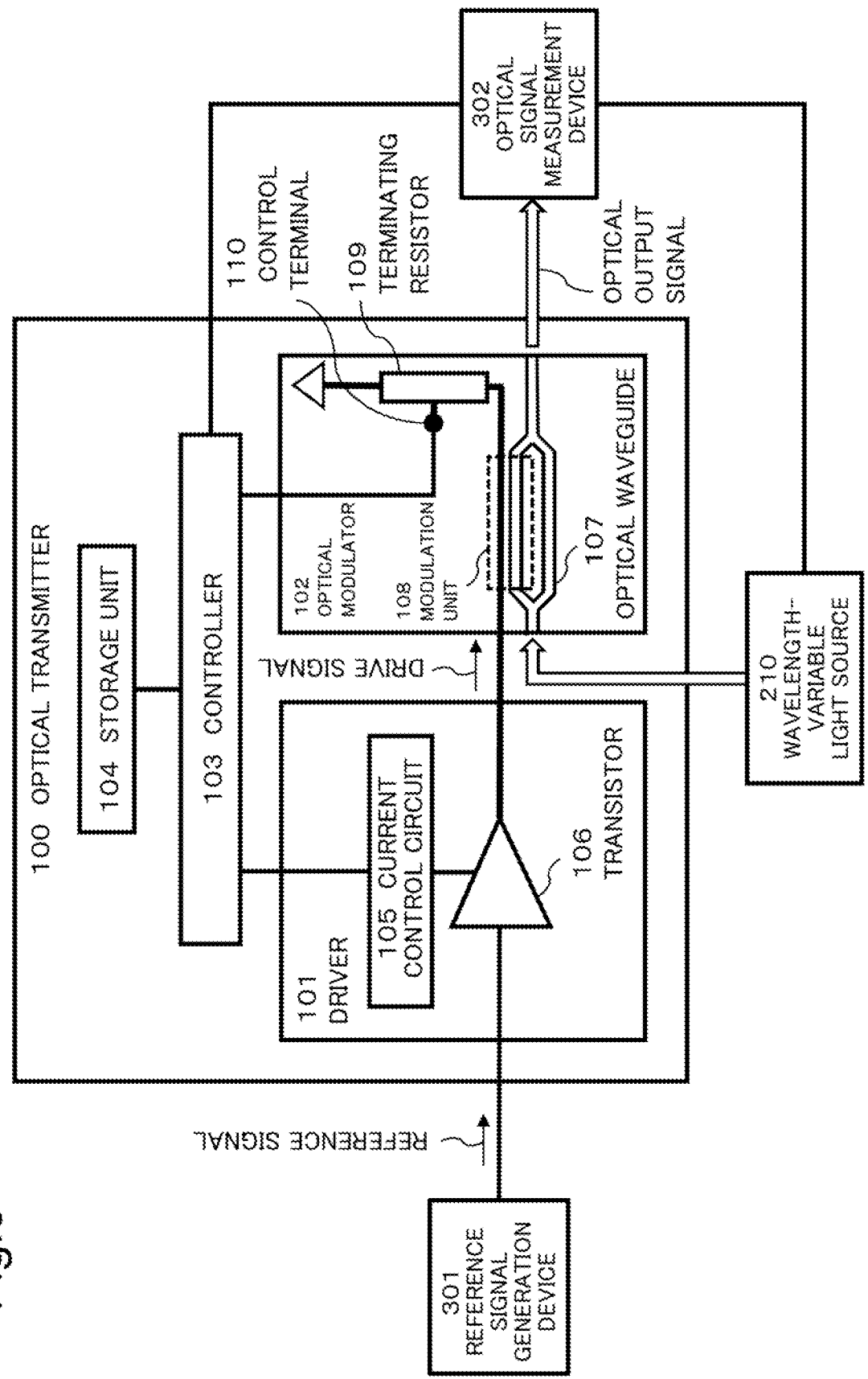
FIG. 9 is a block diagram illustrating a configuration example of an optical transmission system 310.

FIG. 9 is a block diagram illustrating a configuration example of an optical transmission system 310. The optical transmission system 310 is different from the optical transmission system 300 illustrated in FIG. 7 in a point in that a wavelength-variable light source 210 is included instead of the light source 200. The wavelength-variable light source 210 can change a wavelength of light output to an optical modulator 102. An optical signal measurement device 302 controls a wavelength of the wavelength-variable light source 210.

When an optical transmitter 100 is used in a wavelength multiplex transmission system, a wavelength different depending on setting of the system is set as a wavelength of an optical output signal. A wavelength of an optical output signal during operation may be modified based on a modification of a specification of the system. As described above, an impedance of an electrode of a modulation unit 108 for using the optical modulator 102 under a preferable condition has wavelength dependency. Therefore, when a wavelength of an optical output signal is modified, it is preferable to execute again impedance matching between an electrode and a terminating resistor 109 and adjust an amplitude of a drive signal in the modified wavelength.

Therefore, according to the present example embodiment, a procedure for impedance matching described in FIG. 8 is executed by previously changing a wavelength of an optical output signal, and a resistance value of the terminating resistor 109 and drive current are stored in a storage unit 104 as set values in association with the wavelength of the optical output signal. In the optical transmitter 100, when a wavelength of an optical output signal is reported by a monitoring control device of a system or a light source, a controller 103 reads, from the storage unit 104, set values of a resistance value of the terminating resistor 109 and drive current in relation to the wavelength. Based on the set values, the terminating resistor 109 and a current control circuit 105 are controlled. As a result, the optical transmitter 100 can use the optical modulator 102 under a preferable condition for each of wavelengths of different optical output signals.

Figure 10:
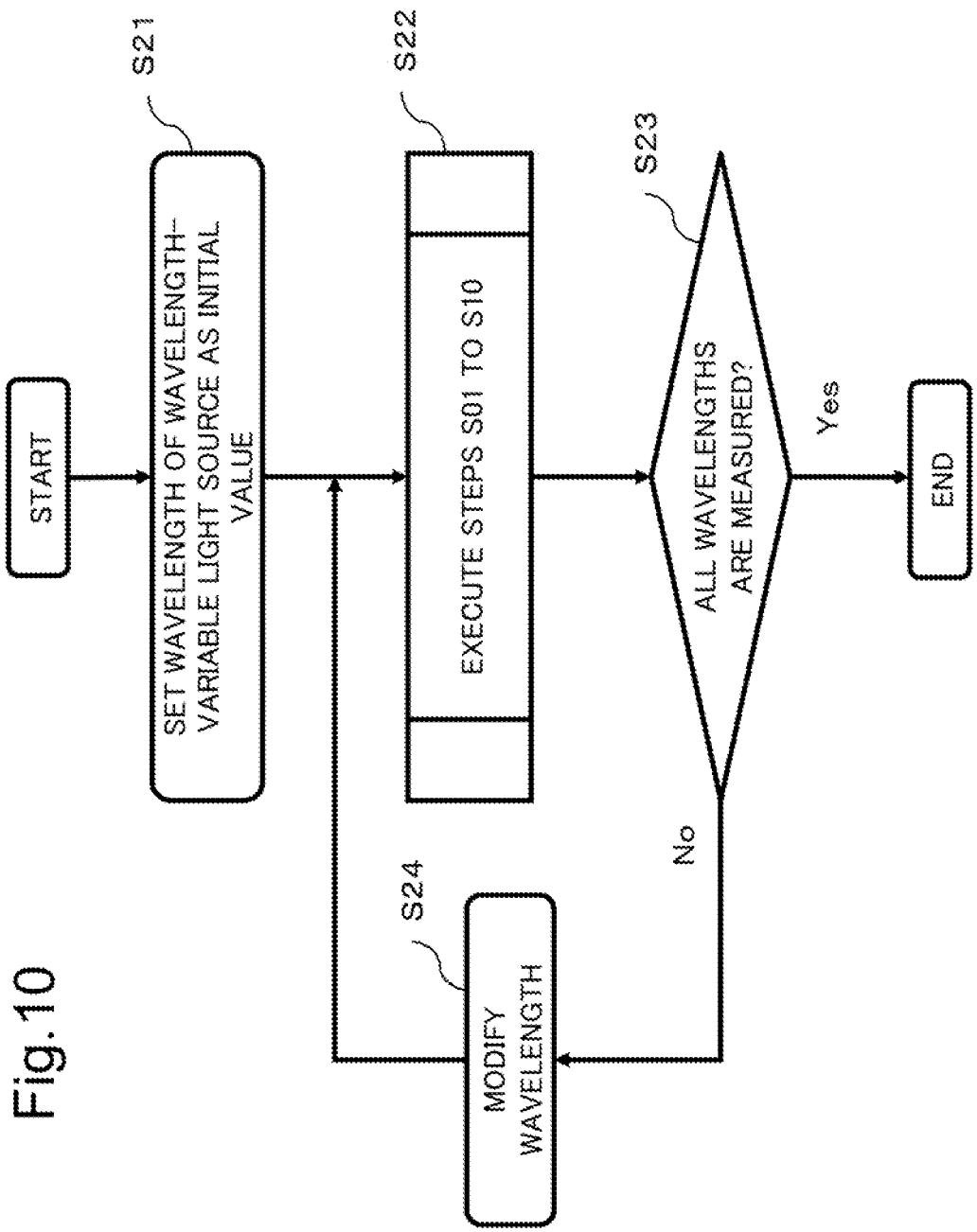
FIG. 10 is a flowchart illustrating an example of a procedure of changing a wavelength and measuring an optical output signal.

FIG. 10 is a flowchart illustrating an example of a procedure of changing a wavelength and measuring an optical output signal. A wavelength of the wavelength-variable light source 210 is set as an initial value (step S21 in FIG. 10). While any initial value is employable, a shortest wavelength of wavelengths usable in the optical transmitter 100 may be set as an initial value. Next, in the set wavelength, a procedure of steps S01 to S10 in FIG. 8 is executed while a wavelength is changed (steps S22 to S24). For example, for each of wavelengths defined by a frequency grid in which the optical transmitter 100 is used, a procedure of step S22 (i.e., a procedure in FIG. 8) is executed. In step S22, set values of a resistance value of the terminating resistor 109 and drive current are stored in the storage unit 104 in association with an output wavelength of the wavelength-variable light source 210 during the measurement. When all scheduled wavelengths are measured (step S23: Yes), processing is terminated. A scheduled wavelength is, for example, a wavelength usable in a system in which the optical transmitter 100 is installed.

As a result, in the optical transmitter 100, even when a wavelength of an optical output signal is modified, it is possible for the controller 103 to read, from the storage unit 104, set values of a resistance value of the terminating resistor 109 and drive current in relation to the modified wavelength and set the set values for the terminating resistor 109 and the current control circuit 105. Therefore, the optical transmitter 100 enables impedance matching between an electrode and a terminating resistance in a board wavelength range and can maintain quality of an optical output signal, for example, even in a wavelength multiplex transmission system.

Third Example Embodiment

Figure 11:
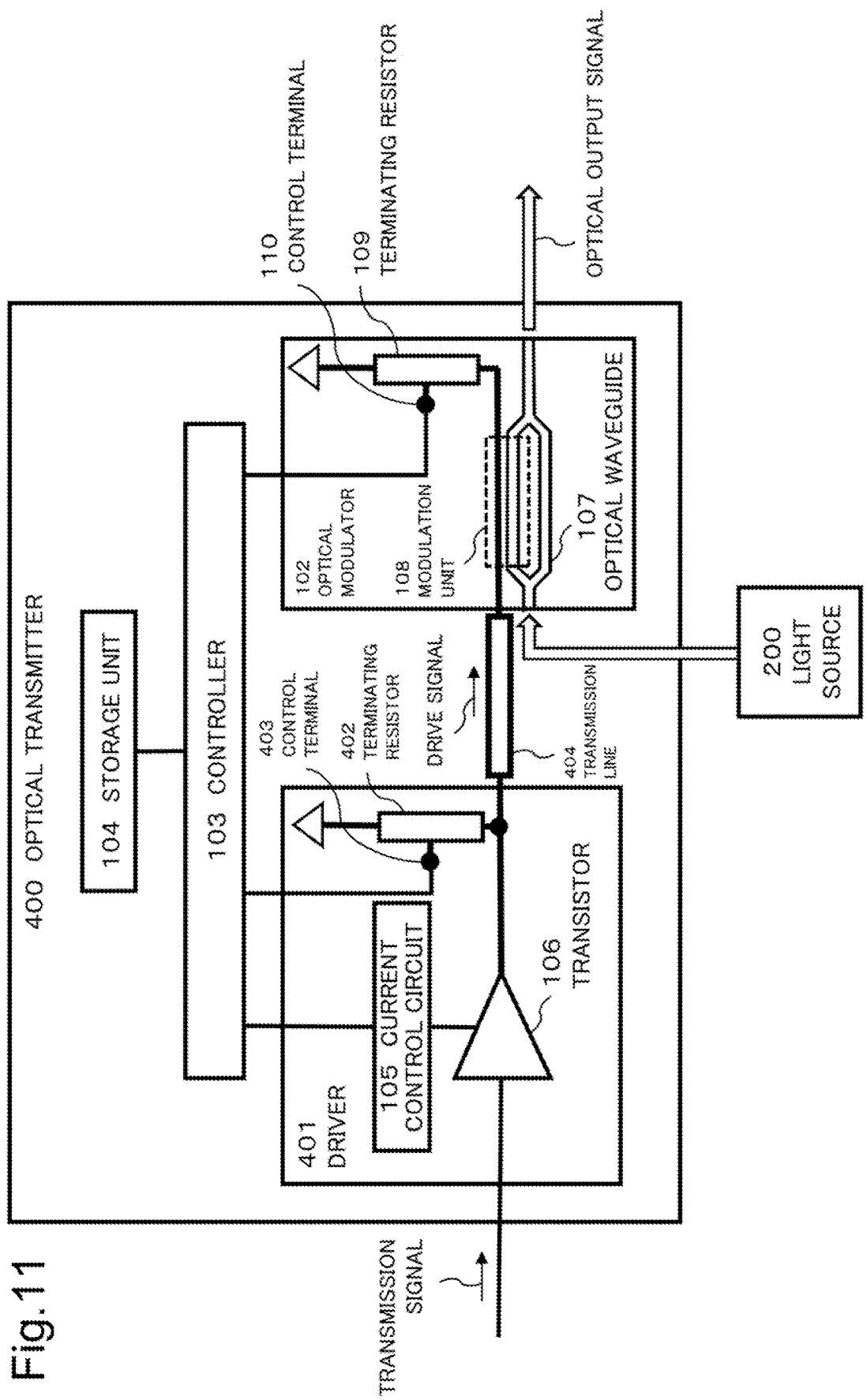
FIG. 11 is a diagram illustrating a configuration example of an optical transmitter 400.

FIG. 11 is a diagram illustrating a configuration example of an optical transmitter 400 according to a third example embodiment. The optical transmitter 400 is different from the optical transmitter 100 in FIG. 1 in a point in that a driver 401 including a terminating resistor 402 is included, and the driver 401 and an optical modulator 102 are connected via a transmission line 404. The transmission line 404 is, for example, a microstrip line and is used when a distance between the driver 401 and the optical modulator 102 is relatively large. The terminating resistor 402 includes a control terminal 403. A resistance value of the terminating resistor 402 is adjustable by an electric signal applied from a controller 103 to the control terminal 403. One end of the terminating resistor 402 is connected to an electrode and the other end of the resistor is grounded.

Even when a resistance value of the terminating resistor 109 is adjusted based on the procedure described according to each of the first and second example embodiments, it is difficult to completely match a difference in impedance due to production variations of the optical modulator 102 and a transmission line 404. Therefore, at a boundary between the optical modulator 102 and the transmission line 404, reflection of a drive signal due to mismatching in impedance may occur. However, the optical transmitter 400 adjusts a resistance value of the terminating resistor 402, and thereby an impedance of the transmission line 404 and a resistance value of the terminating resistor 402 can be made close to a matching state. As a result, it is possible that a drive signal reflected to a direction of a driver 101 at a boundary between the transmission line 404 and the electrode is further reflected at a boundary between the transmission line 404 and the driver 401 and thereby is suppressed from propagating to the optical modulator 102 again. As a result, degradation of a waveform of an optical output signal due to reflection at a connecting point between the optical modulator 102 and the transmission line 404 is reduced.

Adjustment of the terminating resistor 402 may be executed together with adjustment of the terminating resistor 109. For example, in step S06 of the flowchart in FIG. 8, a resistance value of the terminating resistor 109 and a resistance value of the terminating resistor 402 may be adjusted in such a way that a ripple has a value equal to or less than a target value. In this case, after a resistance value of the terminating resistor 109 and a resistance value of the terminating resistor 402 are adjusted, adjustment of drive current based on a procedure of steps S07 to S09 in FIG. 8 is executed. Each of the adjusted resistance value of the terminating resistor 109, the adjusted resistance value of the terminating resistor 402, and the adjusted drive current is stored in the storage unit 104 as a set value.

Alternatively, it may be possible that a resistance value of only either of the terminating resistors 109 and 402 is set based on a procedure of steps S01 to S10 in FIG. 8 and thereafter a procedure of steps S01 to S10 in FIG. 8 may be executed again in order to set a resistance value of the other resistor. When a procedure of steps S01 to S10 is executed a plurality of times, a ripple and a direct current gain each may satisfy a requirement finally. Therefore, at a time of adjustment for the terminating resistor 109 and at a time of adjustment for the terminating resistor 402, target values for a ripple and direct current gain may be different for these resisters.

It may be possible that the configuration in FIG. 9 and the procedure in FIG. 10 according to the second example embodiment are applied to the optical transmitter 400 and a resistance value of the terminating resistor 109, a resistance value of the terminating resistor 402, and drive current of the transistor 106 are adjusted while a wavelength of an optical output signal is changed. Each of these adjustment results is stored in the storage unit 104 as a set value in association with a wavelength of an optical output signal. As a result, the optical transmitter 400 can read, from the storage unit 104, even when a wavelength of an optical output signal is modified, set values of a resistance value of the terminating resistor 109 and drive current in relation to the modified wavelength and set the set values for the terminating resistor 109 and the current control circuit 105. In other words, the optical transmitter 400 also enables impedance matching between an electrode and a terminating resistance in a broad wavelength range and can maintain quality of an optical output signal, for example, even in a wavelength multiplex transmission system.

According to the above-described example embodiments, for the terminating resistor 109 or 402, a variable impedance element capable of setting an impedance from the controller 103 is usable. A variable impedance element is used, and thereby matching between the terminating resistor 109 and an electrode and matching between the terminating resistor 402 and the transmission line 404 can be preferably executed.

A function of each of the example embodiments may be achieved by executing a program by using a central processing unit included in the controller 103. The program is stored in a fixed and non-transitory recording medium. As a recording medium, a semiconductor memory or a fixed magnetic disk device is used without limitation to these. The storage unit 104 may be used as a recording medium.

The example embodiments according to the present invention can be described as, but not limited to, the following supplementary notes.

Supplementary Note 1

An optical transmitter including:
an optical modulation means that includes an electrode and outputs an optical output signal acquired by modulating input light according to a drive signal applied to the electrode;
a driver circuit that generates the drive signal and is connected to the optical modulation means in such a way as to apply the drive signal to one end of the electrode;
a first element that is connected to the other end of the electrode and terminates the drive signal; and
a controller that sets a first resistance value of the first element and a drive amplitude of the drive signal.

Supplementary Note 2

The optical transmitter according to supplementary note 1, wherein the controller sets, based on characteristics of the optical output signal, the first resistance value and the drive amplitude.

Supplementary Note 3

The optical transmitter according to supplementary note 1 or 2, wherein the first resistance value is a resistance value with which a ripple indicated by the optical output signal has a value equal to or less than a first threshold.

Supplementary Note 4

The optical transmitter according to any one of supplementary notes 1 to 3, wherein the drive amplitude is an amplitude with which a direct current gain indicated by the optical output signal falls within a predetermined range.

Supplementary Note 5

The optical transmitter according to any one of supplementary notes 1 to 4, further including
a storage means that stores the first resistance value and the drive amplitude, wherein
the controller sets the first resistance value and the drive amplitude being read from the storage means for the first element and the driver circuit, respectively.

Supplementary Note 6

The optical transmitter according to supplementary note 5, wherein
the storage means stores the first resistance value and the drive amplitude in association with a wavelength, and
the controller sets the first resistance value and the drive amplitude in relation to a wavelength output by the optical transmitter for the first element and the driver circuit, respectively.

Supplementary Note 7

The optical transmitter according to any one of supplementary notes 1 to 4, further including:
a transmission line that connects one end of the electrode and the driver circuit; and
a second element connected to the driver circuit and the transmission line, wherein
the controller sets a second resistance value of the second element.

Supplementary Note 8

The optical transmitter according to supplementary note 7, wherein the second resistance value is a resistance value with which a ripple of the optical output signal has a value equal to or less than a second threshold.

Supplementary Note 9

The optical transmitter according to supplementary note 7 or 8, further including
a storage means that stores the first resistance value, the second resistance value, and the drive amplitude, wherein
the controller sets the first resistance value, the second resistance value, and the drive amplitude being read from the storage means for the first element, the second element, and the driver circuit, respectively.

Supplementary Note 10

The optical transmitter according to supplementary note 9, wherein
the storage means stores the first resistance value, the second resistance value, and the drive amplitude in association with a wavelength, and
the controller sets the first resistance value, the second resistance value, and the drive amplitude in relation to a wavelength output by the optical transmitter for the first element, the second element, and the driver circuit, respectively.

Supplementary Note 11

An optical transmission system including:
the optical transmitter according to supplementary note 5;
a reference signal generation device that outputs a reference signal to the driver circuit; and
an optical signal measurement device that controls, based on characteristics of the optical output signal, the controller, determines, based on a result of controlling the controller, the first resistance value and the drive amplitude, and outputs the determined first resistance value and the determined drive amplitude to the controller, wherein
the controller stores, in the storage means, the determined first resistance value and the determined drive amplitude.

Supplementary Note 12

An optical transmission system including:
the optical transmitter according to supplementary note 6;
a reference signal generation device that outputs a reference signal to the driver circuit; and
an optical signal measurement device that controls, based on characteristics of the optical output signal, the controller, determines, based on a result of controlling the controller, the first resistance value and the drive amplitude, and outputs the determined first resistance value and the determined drive amplitude to the controller in association with a wavelength of the optical output signal, wherein
the controller stores, in the storage means, the determined first resistance value and the determined drive amplitude in association with the wavelength of the optical output signal.

Supplementary Note 13

An optical transmission system including:
the optical transmitter according to supplementary note 9;
a reference signal generation device that outputs a reference signal to the driver circuit; and
an optical signal measurement device that controls, based on characteristics of the optical output signal, the controller, determines, based on a result of controlling the controller, the first resistance value, the second resistance value, and the drive amplitude, and outputs the determined first resistance value, the determined second resistance value, and the determined drive amplitude to the controller, wherein
the controller stores, in the storage means, the determined first resistance value, the determined second resistance value, and the determined drive amplitude.

Supplementary Note 14

An optical transmission system including:
the optical transmitter according to supplementary note 10;
a reference signal generation device that outputs a reference signal to the driver circuit; and
an optical signal measurement device that controls, based on characteristics of the optical output signal, the controller, determines, based on a result of controlling the controller, the first resistance value, the second resistance value, and the drive amplitude, and outputs the determined first resistance value, the determined second resistance value, and the determined drive amplitude to the controller in association with a wavelength of the optical output signal, wherein
the controller stores, in the storage means, the determined first resistance value, the determined second resistance value, and the determined drive amplitude in association with the wavelength of the optical output signal.

Supplementary Note 15

An optical transmission method including:
applying a drive signal generated in a driver circuit to one end of an electrode;
outputting an optical output signal acquired by modulating input light according to a drive signal applied to the electrode; and
setting a first resistance value of a first element that is connected to the other end of the electrode and terminates the drive signal, and a drive amplitude of the drive signal.

Supplementary Note 16

The optical transmission method according to supplementary note 15, further including setting, based on characteristics of the optical output signal, the first resistance value and the drive amplitude.

Supplementary Note 17

The optical transmission method according to supplementary note 15 or 16, wherein the first resistance value is a resistance value with which a ripple indicated by the optical output signal has a value equal to or less than a first threshold.

Supplementary Note 18

The optical transmission method according to any one of supplementary notes 15 to 17, wherein the drive amplitude is an amplitude with which a direct current gain indicated by the optical output signal falls within a predetermined range.

Supplementary Note 19

The optical transmission method according to any one of supplementary notes 15 to 18, further including:
storing the first resistance value and the drive amplitude; and
setting the stored first resistance value and the drive amplitude for the first element and the driver circuit, respectively.

Supplementary Note 20

The optical transmission method according to supplementary note 19, further including:
storing the first resistance value and the drive amplitude in association with a wavelength; and
setting the first resistance value and the drive amplitude in relation to a wavelength of light output by an optical transmitter for the first element and the driver circuit, respectively.

Supplementary Note 21

The optical transmission method according to any one of supplementary notes 15 to 18, further including:
connecting one end of the electrode and the driver circuit via a transmission line; and
setting a second resistance value of a second element connected to the driver circuit and the transmission line.

Supplementary Note 22

The optical transmission method according to supplementary note 21, wherein the second resistance value is a resistance value with which a ripple of the optical output signal has a value equal to or less than a second threshold.

Supplementary Note 23

The optical transmission method according to supplementary note 21 or 22, further including:
storing the first resistance value, the second resistance value, and the drive amplitude; and
setting the stored first resistance value, the second resistance value, and the drive amplitude for the first element, the second element, and the driver circuit, respectively.

Supplementary Note 24

The optical transmission method according to supplementary note 23, further including:
storing the first resistance value, the second resistance value, and the drive amplitude in association with a wavelength; and
setting the first resistance value, the second resistance value, and the drive amplitude in relation to a wavelength of light output by an optical transmitter for the first element, the second element, and the driver circuit, respectively.

Supplementary Note 25

An adjustment method for an optical transmission system, the method including,
in addition to the optical transmission method according to supplementary note 19:
outputting a reference signal to the driver circuit;
determining, based on characteristics of the optical output signal, the first resistance value and the drive amplitude; and
storing the determined first resistance value and the determined drive amplitude.

Supplementary Note 26

An adjustment method for an optical transmission system, the method including,
in addition to the optical transmission method according to supplementary note 20:
outputting a reference signal to the driver circuit;
determining, based on characteristics of the optical output signal, the first resistance value and the drive amplitude; and
storing the determined first resistance value and the determined drive amplitude in association with a wavelength of the optical output signal.

Supplementary Note 27

An adjustment method for an optical transmission system, the method including,
in addition to the optical transmission method according to supplementary note 23:
outputting a reference signal to the driver circuit;
determining, based on characteristics of the optical output signal, the first resistance value, the second resistance value, and the drive amplitude; and
storing the determined first resistance value, the determined second resistance value, and the determined drive amplitude.

Supplementary Note 28

An adjustment method for an optical transmission system, the method including,
in addition to the optical transmission method according to supplementary note 24:
a reference signal generation device that outputs a reference signal to the driver circuit;
determining, based on characteristics of the optical output signal, the first resistance value, the second resistance value, and the drive amplitude; and
storing the determined first resistance value, the determined second resistance value, and the determined drive amplitude in association with a wavelength of the optical output signal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Configurations described according to example embodiments are not necessarily exclusive to each other. Advantageous effects according to the present invention may be achieved by a configuration acquired by combining the whole or a part of the above-described example embodiments.

This application is based upon and claims the benefit of priority from Japanese patent application No. 2018-204055, filed on Oct. 30, 2018, the disclosure of which is incorporated herein in its entirety by reference.

REFERENCE SIGNS LIST

100 Optical transmitter
100 Optical transmitter
101 Driver
102 Optical modulator
103 Controller
104 Storage unit
105 Current control circuit
106 Transistor
107 Optical waveguide
108 Modulation unit
109 Terminating resistor
110 Control terminal
120 Modulation circuit
200 Light source
210 Wavelength-variable light source
300 Optical transmission system
301 Reference signal generation device
302 Optical signal measurement device
310 Optical transmission system
400 Optical transmitter
401 Driver
402 Terminating resistor
403 Control terminal
404 Transmission line

What is claimed is:
1. An optical transmitter comprising:
an optical modulator, including an electrode, configured to output an optical output signal acquired by modulating input light according to a drive signal applied to the electrode;

a driver circuit configured to generate the drive signal and to be connected to the optical modulator in such a way as to apply the drive signal to one end of the electrode;

a first terminating resistor configured to be connected to another end of the electrode and terminate the drive signal; and a controller configured to set a first resistance value of the first terminating resistor and a drive amplitude of the drive signal.

2. The optical transmitter according to claim 1, wherein the controller sets, based on characteristics of the optical output signal, the first resistance value and the drive amplitude.

3. The optical transmitter according to claim 2, wherein the first resistance value is a resistance value with which a ripple indicated by the optical output signal has a value equal to or less than a first threshold.

4. The optical transmitter according to claim 3, wherein the drive amplitude is an amplitude with which a direct current gain indicated by the optical output signal falls within a predetermined range.

5. The optical transmitter according to claim 3, further comprising
a storage circuit configured to store the first resistance value and the drive amplitude, wherein
the controller sets the first resistance value and the drive amplitude being read from the storage circuit for the first terminating resistor and the driver circuit, respectively.

6. The optical transmitter according to claim 2, wherein the drive amplitude is an amplitude with which a direct current gain indicated by the optical output signal falls within a predetermined range.

7. The optical transmitter according to claim 2, further comprising
a storage circuit configured to store the first resistance value and the drive amplitude, wherein
the controller sets the first resistance value and the drive amplitude being read from the storage circuit for the first terminating resistor and the driver circuit, respectively.

8. The optical transmitter according to claim 2, further comprising:
a transmission line that connects one end of the electrode and the driver circuit; and
a second terminating resistor connected to the driver circuit and the transmission line, wherein
the controller sets a second resistance value of the second terminating resistor.

9. The optical transmitter according to claim 1, wherein the first resistance value is a resistance value with which a ripple indicated by the optical output signal has a value equal to or less than a first threshold.

10. The optical transmitter according to claim 9, wherein the drive amplitude is an amplitude with which a direct current gain indicated by the optical output signal falls within a predetermined range.

11. The optical transmitter according to claim 9, further comprising
a storage circuit configured to store the first resistance value and the drive amplitude, wherein
the controller sets the first resistance value and the drive amplitude being read from the storage circuit for the first terminating resistor and the driver circuit, respectively.

12. The optical transmitter according to claim 9, further comprising:
a transmission line that connects one end of the electrode and the driver circuit; and
a second terminating resistor connected to the driver circuit and the transmission line, wherein
the controller sets a second resistance value of the second terminating resistor.

13. The optical transmitter according to claim 1, wherein the drive amplitude is an amplitude with which a direct current gain indicated by the optical output signal falls within a predetermined range.

14. The optical transmitter according to claim 13, further comprising
a storage circuit configured to store the first resistance value and the drive amplitude, wherein
the controller sets the first resistance value and the drive amplitude being read from the storage circuit for the first terminating resistor and the driver circuit, respectively.

15. The optical transmitter according to claim 1, further comprising
a storage circuit configured to store the first resistance value and the drive amplitude, wherein
the controller sets the first resistance value and the drive amplitude being read from the storage circuit for the first terminating resistor and the driver circuit, respectively.

16. The optical transmitter according to claim 15, wherein the storage circuit stores the first resistance value and the drive amplitude in association with a wavelength, and
the controller sets the first resistance value and the drive amplitude in relation to a wavelength output by the optical transmitter for the first terminating resistor and the driver circuit, respectively.

17. An optical transmission system comprising:
the optical transmitter according to claim 16;
a reference signal generation device configured to output a reference signal to the driver circuit; and
an optical signal measurement device configured to control, based on characteristics of the optical output signal, the controller, determine, based on a result of controlling the controller, the first resistance value and the drive amplitude, and output the first resistance value determined and the drive amplitude determined to the controller in association with a wavelength of the optical output signal, wherein
the controller stores, in the storage circuit, the first resistance value determined and the drive amplitude determined in association with the wavelength of the optical output signal.

18. An optical transmission system comprising:
the optical transmitter according to claim 15;
a reference signal generation device configured to output a reference signal to the driver circuit; and
an optical signal measurement device configured to control, based on characteristics of the optical output signal, the controller, determine, based on a result of controlling the controller, the first resistance value and the drive amplitude, and output the first resistance value determined and the drive amplitude determined to the controller, wherein
the controller stores, in the storage circuit, the first resistance value determined and the drive amplitude determined.

19. The optical transmitter according to claim 1, further comprising:
- a transmission line that connects one end of the electrode and the driver circuit; and
- a second terminating resistor connected to the driver circuit and the transmission line, wherein
- the controller sets a second resistance value of the second terminating resistor.

20. An optical transmission method comprising:
- applying a drive signal generated in a driver circuit to one end of an electrode;
- outputting an optical output signal acquired by modulating input light according to a drive signal applied to the electrode; and
- setting a first resistance value of a first terminating resistor that is connected to another end of the electrode and terminates the drive signal, and a drive amplitude of the drive signal.

* * * * *